April 16, 1957 H. C. FOSTER 2,789,005
PROJECTILE FISHING TOOL
Filed March 17, 1954
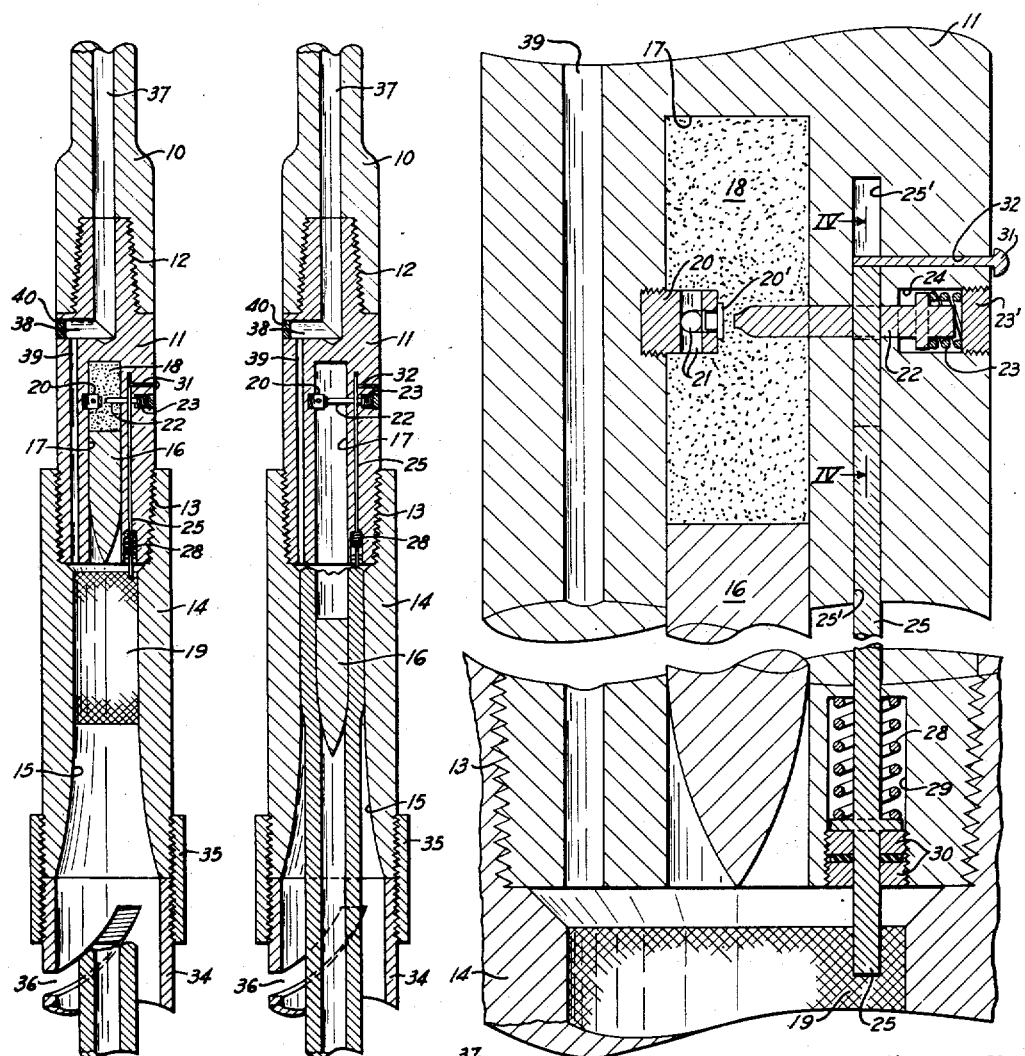
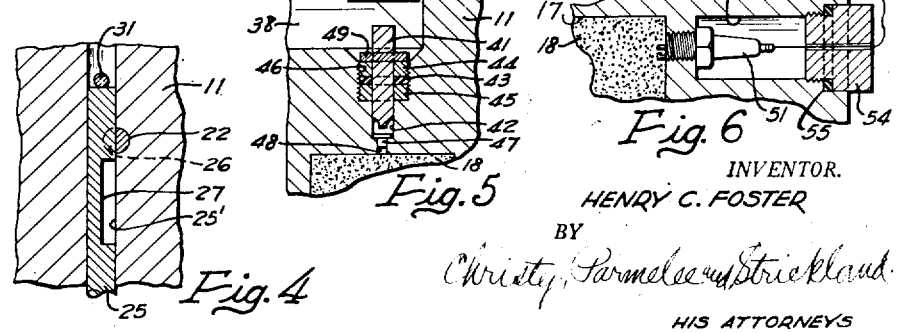
INVENTOR.
HENRY C. FOSTER
BY
Christy, Parmelee & Strickland
HIS ATTORNEYS

United States Patent Office 2,789,005
Patented Apr. 16, 1957

2,789,005

PROJECTILE FISHING TOOL

Henry C. Foster, Wexford, Pa.

Application March 17, 1954, Serial No. 416,820

6 Claims. (Cl. 294—93)

This invention relates to fishing tools. More particularly the invention relates to a fishing tool which utilizes a projectile for connecting the tool to a tubular fish which is located in the bottom of a deep well for the purpose of drawing the fish out of the well.

In the drilling of deep wells, particularly oil and gas wells, pipe, tubing, casing, drill stems or the like often become free or released in the bottom of the well and it is necessary to remove such a hollow member or fish before further drilling can continue or before pumping apparatus can be used in the well. The only thing that can be contacted is the upper end of the fish.

The primary object of the present invention is to provide a fishing tool which can be connected with a fish in the bore of a well by a projectile and then draw the fish out of the well.

Another object of the invention is to provide a fishing tool with a projectile and an explosive charge which can be repeatedly loaded, fired to connect the tool with a fish, thereafter disconnected from a fish after drawing it out of a well and used again.

A further object of the invention is to provide a fishing tool for connection with a fish by a projectile, which can position and condition a fish to receive a projectile connector.

A still further object of the invention is to provide a fishing tool having an explosive-fired projectile in which the firing of the projectile will only occur when the tool is properly positioned on the fish.

An alternative object of the invention is to provide a well fishing tool for connection of the tool to a fish by an explosive fired projectile in which the firing of the projectile may be manually controlled at the ground surface adjacent the well.

With these and other objects in view the invention consists in the fishing tool with a projectile connector as herein illustrated and described and particularly defined in the appended claims.

The various features of the invention are illustrated in the accompanying drawings in which:

Fig. 1 is a vertical sectional view of a fishing tool embodying the preferred form of the invention, showing the fishing tool in the process of positioning the fish for connection with the tool;

Fig. 2 is a vertical sectional view of the fishing tool showing the tool connected with a fish by the projectile;

Fig. 3 is an enlarged vertical sectional view of part of the projectile barrel of the fishing tool which contains the projectile, the explosive charge and the explosive firing parts;

Fig. 4 is a detailed sectional view of the trigger rod and the mechanism for releasing the explosive firing pin;

Fig. 5 is a detailed sectional view showing the mounting of a firing pin in the top of the projectile barrel in position to ignite the projectile explosive charge by a firing weight which may be manually inserted in the bore of the drill pipe to rapidly pass down through the bore to strike the firing pin; and Fig. 6 is a detailed sectional view showing the mounting of a spark plug in the explosive charge in the projectile barrel to fire the explosive with a magneto induced electric spark which is controlled from the top of the well.

The fishing tool as illustrated in the drawings is adapted particularly for attachment to the well known and usual drilling pipe, 10, which extends from the top of the well to the bottom thereof. This drilling pipe may be replaced by a cable socket which is attached to a cable for the purpose of lowering the fishing tool to the bottom of the well and for pulling the fishing tool out of the well. A drilling pipe, however, is very advantageous with the present invention because it is often desirable to pass water, mud or a lubricant to the bottom of the well for the purpose of washing away sand and other foreign material which may interfere with the fishing tool in obtaining a secure attachment to the fish or tubular member to be drawn out of the well.

The fishing tool consists of a projectile barrel 11 which has a thread connection 12 with the drill pipe or collar 10. To the bottom of the projectile barrel is connected, by a threaded connection 13, a gripping collar 14. The gripping collar has an inside diameter which is slightly larger than the diameter of the fish which is to be withdrawn from the well. The walls of the gripping collar are enlarged or reinforced for the purpose of standing the strain of a projectile which is to be shot into the end of the fish for the purpose of expanding the fish in the collar as will be herein after described. The lower end of the collar 14 has a frustoconical shape 15 for the purpose of guiding the end of the fish into the collar 14 to accurately position it to receive the projectile. The projectile 16 is mounted in a lower end of a chamber 17 formed in the barrel 11. Above the projectile the chamber 17 is filled with an explosive charge 18 which is used for the purpose of shooting the projectile from the barrel into the opening of a tubular fish. The projectile 16 is constructed to fit tightly within the chamber 17, so that the explosive when ignited will shoot the projectile into the fish with a great force. As illustrated in Fig. 2 the wall of the fish which is normally smaller in diameter than the diameter of the inside of the gripping collar is expanded by the projectile 16 against the inside wall of the collar 14 to securely lock the upper end of the fish within the collar. Preferably the inside wall of the collar is knurled at 19 and the inner surface hardened in order to secure a firm grip on the fish.

The shooting of the projectile into the fish is carried out by means of a triggering mechanism which is operated at the time that the fish is located within the collar and projects to the upper end of the collar in contact with the knurled surface 19 of the collar. The projectile shooting mechanism is illustrated more particularly in Figs. 3 and 4. Within the explosive containing portion of the chamber 17 is mounted a primer holder 20. A primer 20' is mounted in the front of the holder and behind the primer are holes 21 by which a flash or fire from the primer or cap may come into contact with the explosive charge. To fire the primer 20' a firing pin 22 is mounted in the barrel 11 and is normally held in a position where the end of the pin 22 is separated from the primer 20'. The pin is normally urged into firing position by a strong compression spring 23 held by nut 23' mounted in a chamber 24 in the barrel 11. In order to prevent the firing pin from being prematurely forced by the spring 23 into contact with the primer, a trigger rod 25 is slideably mounted in a guideway 25' in the barrel and passes through a semicircular groove 26 Fig. 4 in the pin to hold it against the normal movement of the spring 23. Trigger rod 25 has an elongated slot 27 therein which, when moved to firing position opposite the firing pin, will allow the pin to strike the primer 20' under the action of the spring 23. The trigger rod 25 normally projects below the bottom of the barrel 11 as illustrated in Figs. 1 and 3 in a position to engage the upper end of the fish when the tool is moved down over the fish to secure a grip thereon. The trigger rod is normally held by means of a compression spring 28 mounted in a chamber 29 in a position projecting below the bottom of the barrel 11. The spring 28 is held in position in the chamber 29 by packing nuts 30. When the lower end of the rod 25 engages the fish, the weight of the tool will force the rod upwardly to position the slot 27 opposite the firing pin to allow the firing pin to be forced into firing engagement with the primer 20' by means of the spring 23. When the primer is fired the powder will burn and shoot the projectile into the upper end of the fish as illustrated in Fig. 2.

For loading the fishing tool with a projectile and explosive preparatory for a fishing job, the nut 23' is withdrawn to allow the firing pin 22 to be moved out into a position shown in Figs. 3 and 4 where the trigger rod is located in a groove 26 in the pin 22 to lock the firing pin in retracted position. The nut 23' is then inserted into the opening in the barrel to compress the spring 23 preparatory for firing. When the fishing tool is loaded with explosive and a projectile, the trigger rod is prevented from releasing the firing pin for firing the charge by a safety pin 31 which is inserted into an opening 32 and extends into the guideway 25'. When the fishing tool is prepared to go down into a well for a fishing job, the safety pin 31 is withdrawn to release the trigger rod in preparation for firing the explosive and shooting the projectile.

Although the bottom of the gripping collar is shaped to guide a fish into proper position for receiving the projectile, it is sometimes difficult to get the fish properly centered to be gripped by the fishing tool. Accordingly a centering sleeve 34 is attached to the bottom of the collar 14 by means of a coupler 35. The side wall of the sleeve 34 is preferably provided with a helical guide slot 36 which acts to center the fish as the sleeve is moved down over the fish.

The locking engagement of the gripping collar with the upper end of the fish by means of a projectile is generally so tight that the gripping collar cannot be separated from the fish without injuring or destroying it. Therefore, a new gripping collar is generally supplied for the tool each time that it is used for a fishing job. The sleeve 34 with its helical slot generally does not become attached to the fish tightly and therefore it is desirable to have a thread connection between the sleeve 34 and the bottom of the gripping collar 14 so that the sleeve may be recovered and reused.

Often the fish becomes embedded in sand or mud in the bottom of a well and it is necessary to clean around the upper end of the fish in order to get a good grip on the fish. To provide for this an opening 37 in the drill pipe is used for the purpose of forcing water, mud or lubricant down into the well to wash away foreign material from the upper end of the fish. To assist in applying the washing fluid and to position the fish, a passageway 38 is formed in the upper end of the projectile barrel 11, which communicates with a series of bores 39 extending through the projectile barrel. Fluid therefore flows from the passageway 37 through the passageway 38 and down through the bores 39 into the upper portion of the gripping collar. This directs the washing liquid around all sides of the fish to wash away foreign material that might interfere with getting a good grip on the fish. This exploratory and cleaning operation is carried out until the fish is passed through the sleeve 34 and collar 14 and comes into contact with the trigger rod in order to shoot the projectile 16.

After the fishing tool has been secured to the upper end of the fish, it is often desirable to introduce water, mud or a lubricant through the drill pipe to pass fluid around the outside of the fishing tool in order to cut down the resistance to movement of the tool and fish as they are pulled out of the well. To this end the passageway 38 is arranged to communicate with the outside of the projectile barrel and a plug 40 normally closes this outlet. Preparatory to drawing the tool and a fish attached thereto out of the well, the pressure on the washing fluid is increased sufficiently to blow out the plug so that fluid may pass out around the tool and fish to assist in removing them from the well.

The condition and size of well and the type and condition of the fish may make it desirable to shoot the fishing projectile manually after exploring and working the tool into contact with the fish. With the apparatus of Fig. 5, an operator may fire the projectile at any time desired while the fishing tool is located in a well. The apparatus of Fig. 5 may be substituted for, or used in conjunction with, the mechanism shown in Figs. 1 to 4 for igniting the projectile firing charge when the charge is to be ignited manually.

The manually operative projectile firing apparatus consists of a firing pin 41 which is located in a hole 42 in the upper end of the projectile barrel directly in line with the bore 37 through the drill pipe. The hole 42 does not project entirely through the projectile barrel from the bottom of the bore 37 to the top of the chamber 17 for holding the explosive charge. The pin 41 is held in position in the hole 42 by means of a packing ring 43 that is compressed between nuts 44 and 45 threaded into an opening 46 in the top of the projectile barrel. A mercury fulminate primer 47 is mounted in the bottom of the hole 42 and extends into a small hole 48 which extends from the bottom of the hole 42 to the chamber 17. The normal position of the firing pin is that illustrated in Fig. 5. The pin is prevented from coming into contact with the primer 47 by means of a brass shear pin 49 which extends through the firing pin and rests against the nut 44.

When an operator wishes to fire the projectile, a heavy weight, 50, having a diameter which permits it to loosely pass through the bore 37 is dropped from the top of the well into the bore 37 and falls through the bore to strike the firing pin with a great force. When the weight hits the firing pin, the shear pin 49 is cut off and the pin is driven with force against the fulminate primer to ignite the explosive charge in the chamber 17.

The apparatus illustrated in Fig. 5 is well adapted for manual firing of the projectile when a drill pipe is used with the fishing tool. If a cable socket is connected with the tool and a cable runs from the top of the well to the socket, then the apparatus of Fig. 5 is not adapted for firing the projectile charge. To manually fire an explosive charge in a tool connected with a cable an apparatus such as illustrated in Fig. 6 is employed. In this apparatus a spark plug 51 is mounted in the side of the projectile barrel 11 and has the spark points located within the chamber 17 in contact with the explosive charge. The spark plug 51 is threaded into the bottom of a chamber 52 in the barrel 11 and has an electrical wire 53 running from the spark plug through a plastic plug 54 which is threaded into the opening 52 and has a gasket 55 for closing the chamber 52 to protect the spark plug. The electrical wire 53 connected with the spark plug is then led to the top of the well to be connected with a magneto type detonater for placing a high voltage electrical charge across the electrodes of the spark plug to produce a spark for igniting the explosive charge. The spark plug is grounded in the tool and the wire 53 is coated with a high voltage waterproof coating.

The preferred form of the invention having been thus described, what is claimed as new is:

1. In a fishing tool for insertion into wells for removal of a hollow tubular member remote from the well opening, a projectile barrel having a central opening extending inwardly from the bottom thereof, a gripping collar forming an extension of the barrel, an opening extending longitudinally through the collar having its upper end portion aligned with the center of the barrel opening and of a size to snugly fit the member to be removed, the bottom portion of said collar opening flaring outwardly to engage and guide the end of said member into the upper end of the collar opening as the barrel and collar are lowered into the opening over said member, an explosive charge within said projectile barrel opening, a projectile within said barrel opening beneath said charge and having a body portion larger in diameter than the interior of said hollow member, the lower end of the projectile being tapered for ready entrance into the hollow member opening, and means for firing the charge when the member is positioned within the upper end of the gripping collar opening.

2. The fishing tool as in claim 1 wherein means for firing the charge comprises, a primer cap mounted within the projectile barrel in contact with the charge, a spring actuated primer cap firing pin is located adjacent the primer cap and held in spaced relation thereto by a trigger rod movably mounted on the barrel for release of the firing pin, an extension of said trigger rod disposed within the upper end of the gripping collar to be moved to firing pin release position as the hollow member is engaged in the gripper collar opening.

3. The fishing tool as in claim 1 wherein the projectile barrel has a drilling pipe connected to the upper end thereof, an opening in the top of the projectile barrel connects with the opening in the drill pipe, a series of passageways extend longitudinally of the projectile barrel independently of the opening for the projectile to connect the top opening in the barrel with the opening in the gripping collar, and means for forcing washing fluid through the drill pipe, projectile barrel openings and gripping collar onto the upper end of the tubular member to prepare said end to be engaged by the gripping collar.

4. The fishing tool as in claim 3 wherein the said opening in the top of the projectile barrel has an extension through the side wall of the barrel, and a frangible plug normally closes the side wall opening.

5. The fishing tool as in claim 4 wherein the means for firing the projectile charge comprises an opening in the projectile barrel connecting the explosive charge with the drill rod control opening, a primer cap is disposed in said barrel opening in spaced relation to the explosive charge, a firing pin is disposed within said barrel opening and normally held in spaced relation to the primer cap by a shear pin, said firing pin when struck by a falling object moving through said drill pipe and projectile barrel top opening shearing said pin to fire said cap.

6. The fishing tool as in claim 1 wherein the means for firing said explosive charge comprises a spark plug mounted within the projectile barrel with the spark point located in contact with the explosive charge, and a wire extends from the spark plug to the top of the well for selectively charging the spark plug to fire the explosive charge.

References Cited in the file of this patent
UNITED STATES PATENTS

| | | |
|---|---|---|
| 1,011,324 | Darling | Dec. 12, 1911 |
| 1,277,370 | Bovard | Sept. 3, 1918 |
| 1,752,656 | Spang | Apr. 1, 1930 |
| 2,045,333 | Pipes | June 23, 1936 |
| 2,141,098 | Wahlstrom | Dec. 20, 1938 |
| 2,146,923 | Wahlstrom | Feb. 14, 1940 |
| 2,550,080 | Moore | Apr. 24, 1951 |
| 2,595,902 | Stone | May 6, 1952 |